United States Patent [19]

Leiber et al.

[11] 4,005,910
[45] Feb. 1, 1977

[54] ANTILOCKING CONTROL SYSTEM

[75] Inventors: Heinz Leiber, Leimen; Werner Weber, Nussloch, both of Germany

[73] Assignee: Teldix G.m.b.H., Heidelberg, Germany

[22] Filed: Apr. 23, 1976

[21] Appl. No.: 679,877

[30] Foreign Application Priority Data

Apr. 24, 1975 Germany .................... 2518196

[52] U.S. Cl. .................... 303/96; 303/106
[51] Int. Cl.² .................... B60T 8/02; B60T 8/10
[58] Field of Search ............. 303/96, 97, 103, 105, 303/106, 111

[56] References Cited

UNITED STATES PATENTS

| | | | |
|---|---|---|---|
| 3,535,004 | 10/1970 | Howard | 303/96 |
| 3,797,892 | 3/1974 | Leiber | 303/106 |

Primary Examiner—Trygve M. Blix
Assistant Examiner—Reinhard J. Eisenzopf
Attorney, Agent, or Firm—Spencer & Kaye

[57] ABSTRACT

An antilocking control system for vehicles in which control signals for controlling a pressure regulating unit associated with two wheels or two groups of wheels are produced in an evaluating circuit from the signals of at least one sensor associated with these wheels or groups of wheels and in which the pressure is at times controlled based on the rotational behavior of the wheel first tending to lock (select-low) and at times based on the rotational behavior of the wheel being the last to show a tendency to lock (select-high). During the select-low mode of operation the duration $T_1$ of the pressure buildup phase following a pressure reduction phase is measured until there again occurs a tendency to lock at at least one wheel and then the mode of operation is switched to the select-high mode. During the select-high mode of operation the duration $T_2$ of the pressure increase period is measured and the result is continuously compared with the measured duration $(T_1)$ of the pressure buildup phase during select-low operation. When the measured duration $T_2$ reaches a given relationship to the duration $T_1$, the select-high mode of operation is continued for a given duration $T_3$ after which the mode of operation is switched back to the select-low mode. A switching arrangement is provided which responds if, during the select-high mode of operation, the second wheel (or group of wheels) also shows a tendency to lock before a given time duration $T_2$ has been reached, to effect switching back to the select-low mode of operation.

28 Claims, 7 Drawing Figures

ANTILOCKING CONTROL SYSTEM

BACKGROUND OF THE INVENTION

The present invention relates to an antilocking control system for vehicles in which control signals for controlling a pressure regulating unit associated with two wheels or two groups of wheels are produced in an evaluating circuit from the signals of sensors associated with different wheels or groups of wheels when a wheel shows a tendency to lock (select-low) and at times when both monitored wheels show a tendency to lock (select-high).

Antilocking control devices of the above-mentioned type are known, for example, from U.S. Pat. No. 3,535,004, issued Oct. 20, 1970 to D. W. Howard et al. In this patent the control channel normally receives the voltage corresponding to the slower rotating vehicle wheel (select-low). A switch to select-high regulation, i.e., the feeding of the voltage corresponding to the speed of the faster rotating wheel, is actuated if and as long as the wheels rotate at significantly different speeds, i.e., are on ground having significantly different coefficients of friction. On such ground, the one wheel, with select-low control, would contribute only insignificantly to the braking effort. The known arrangement serves the purpose of saving control channels so as to reduce the cost of the antilock control system.

German Offenlegungsschrift No. 2,119,590 corresponding to U.S. Pat. No. 3,797,892, issued Mar. 19, 1974 to H. Leiber et al discloses, for common control of the brake pressure, a switch from the normally effective select-high mode of control to the select-low mode of control whenever transverse accelerations occur or are to be expected. In this case the drawbacks of the select-high mode of control are to be eliminated when braking in curves.

German Offenlegungsschrift No. 2,243,260 corresponding to U.S. Pat. No. 3,907,378, issued Sept. 23, 1975, to H. Leiber et al finally discloses normal operation with select-low and a switch to select-high, for a given period of time, a given period after the occurrence of a control signal so that here, too, the pressures at two wheel brakes are controlled together.

SUMMARY OF THE INVENTION

It is the object of the present invention to even better utilize the braking force when the brake pressures at two wheels are being controlled together.

This is accomplished according to the present invention, in that, in an antilocking control system as described above, means are provided which, during the normal select-low mode of operation, measure the duration ($T_1$) of the pressure buildup period which follows a pressure reduction period until a new tendency to lock occurs at least at one wheel; a switching device is provided which responds to the occurrence of such a tendency to lock and then effects switching to a select-high mode of operation; further means are provided which measure the duration ($T_2$) of the period of pressure increase during the select-high mode of operation and continuously compare the measured result with the measured duration ($T_1$) of the pressure buildup during select-low operation; control means are provided which respond when the measured duration $T_2$ has reached a given relationship with the previously measured duration $T_1$ to effect retention or continuation of the select-high mode of operation for a given period of time $T_3$ and to then effect switching back to the select-low mode of operation; and switch-back means are provided which become effective to cause switching back to a select-low mode of operation if during the select-high mode of operation, and before the given relationship of period $T_2$ to period $T_1$ has been reached, the second wheel likewise shows a tendency to lock.

Within the scope of the above-explained invention, the same result can also be obtained if instead of the periods $T_1$ and $T_2$ the longitudinal deceleration of the wheel $V^*_F$ is measured once during the pressure buildup period during the select-low mode of operation, preferably at the moment of switching to the select-high operation, i.e., at the renewed occurrence of a tendency to lock at the wheel which determines the select-low regulation ($V^*_{F1}$), and after the select-high regulation has become effective, the momentary deceleration of the vehicle $V^*_{F2}$ is compared with the stored longitudinal deceleration of the wheel $V^*_{F1}$. After the parameter $V^*_{F2}$ reaches a certain relationship to $V^*_{F1}$ (e.g. X% greater vehicle deceleration or $V^*_{F1}$ +constant delay value) the select-high mode of operation is maintained for time period $T_3$. If however this relationship is not reached before the second wheel becomes unstable, the system is switched back to select-low operation when the second wheel becomes unstable.

In the present invention, a test is made whether the wheels are disposed on ground with very different coefficients of friction. If this is the case, it is favorable with respect to the braking path to drive with select-high operation since in select-low operation, the wheel which actually would be better able to brake because it moves on more favorable ground would hardly contribute to the braking effort. Thus the worst braking wheel is permitted to lock as a result of the switch to select-high and the pressure of the better braking wheel is regulated.

If however the braking efforts of the two wheels do not differ significantly, locking of one wheel is avoided and the pressure of the wheel which first tends to lock is regulated, i.e., select-low operation becomes effective.

If in the test to be made it is determined that select-high operation is to be maintained, this mode remains effective for a given time period $T_3$, e.g. 1 second. Likewise, when the decision is made that select-low operation is to remain in effect, this mode can be maintained for a given period of time $T_4$ of likewise 1 second, for example. Two counters fed by clock pulses may be used to measure the time periods $T_1$ and $T_2$ with their counting states being compared, whereupon an output signal is produced, for example, when the counting states coincide. Time periods $T_1$ and $T_2$ can also be selected to be different in that pulse sequences with different pulse repetition frequencies are employed or in that the starting values are different.

Instead of two counters, a forward-backward counter can be used which counts in one direction during time period $T_1$ and in the other direction during time period $T_2$. In this case it is preferable to use counting pulse sequences of different frequencies for the different counting directions, particularly if time period $T_2$ is shorter than time period $T_1$. Preferably the pulse frequencies are selected so that the starting value of the counter will again have been reached at the end of time period $T_2$.

If the time periods $T_4$ and $T_3$ during which select-low or select-high operation, respectively, are maintained equal, a common time member may be provided.

According to a feature of the present invention the evaluation circuit preferably includes circuit means for producing slip signals where the slip signals belonging to various wheels or groups of wheels are combined once via an OR linkage and once via an AND linkage. The output signals from the OR linkage are made effective at the pressure control device when select-low operation is desired and the output signals from the AND linkage are made effective when select-high operation is desired.

Additionally, the wheel deceleration beginning at a certain value can also be included in the control operation, but in this case pressure reduction as a result of such deceleration signal should preferably be permitted only during select-low operation. In a known manner, blocking means may be provided which suppress the effect of the wheel deceleration signals during the first control cycle. Moreover a given value of wheel acceleration can be utilized to prevent pressure reduction as a result of slip signals when such a wheel acceleration signal is present. If slip signals are obtained from both sensors, it is favorable to not let the wheel acceleration signal become effective.

The control system according to the present invention will preferably be used for the combined regulation of the pressure at the brakes of a single axle. However, the brakes of diagonally opposite wheels can also be pressure regulated in this manner according to the invention. The same arrangement can be provided once more for the other wheels or the other wheels may be covered only by a sensor which is disposed, for example, at the differential. The present invention is of particular interest for single controls as disclosed in U.S. patent appln. Ser. No. 624,572, filed Oct. 21, 1975 by Heinz Leiber.

DETAILED DESCRIPTION OF THE PREFERRED EMBODIMENTS

Figure 1:
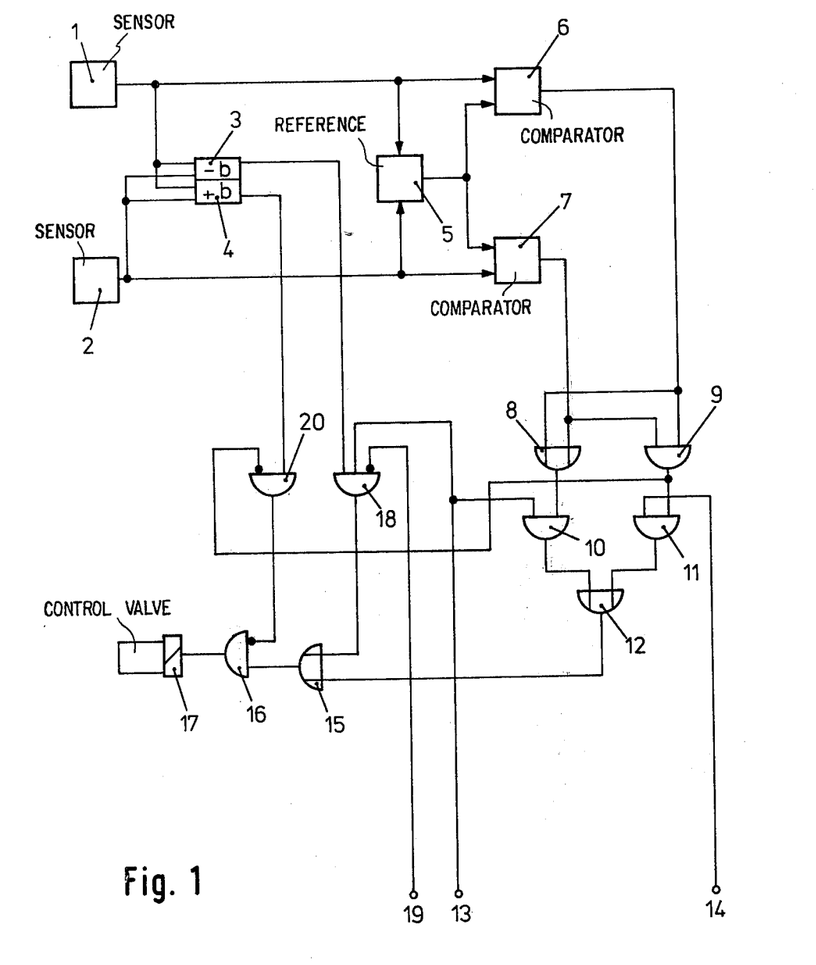
FIG. 1 is a schematic diagram of a preferred embodiment according to the invention of the evaluation and control circuit for the pressure regulating member.

Referring now to FIG. 1, there is shown a control circuit according to the invention including sensors or transducers 1 and 2 associated, for example, with the two wheels of one axle of a vehicle. The output signal from sensors 1 and 2 are fed (1) to members 3 and 4, respectively (which are per se well known in the art) to produce switching signals upon the occurrence of certain wheel accelerations ($+b$) and wheel decelerations ($-b$); (2) to reference value generator 5 to produce a reference value which approximately corresponds to the speed of the vehicle; and to comparators 6 and 7 respectively, where these signals are compared with the reference value from generator 5 and an output signal is produced when the wheel speed value has a certain relationship to the reference value, i.e., when the speed of the wheel deviates in a certain manner from the speed of the vehicle.

The outputs of comparators 6 and 7 are connected to an OR gate 8 and to an AND gate 9 whose outputs lead to one input of AND gates 10 and 11 respectively. The decision whether AND gate 10 or AND gate 11 is enabled, i.e., whether the select-low mode or the select-high mode of operation is required, depends on whether a control signal is present at terminal 13 which is connected to the other input of AND gate 10, or at terminal 14 which is connected to the other input of AND gate 11. The control signals at terminals 13 and 14 are generated by the circuit shown in FIG. 2.

The control signal at terminal 13 or 14 when permitted to pass by AND gate 10 or 11 respectively, travels via series connected OR gates 12 and 15 and normally enabled AND gate 16 to a control valve 17 which in this case is assumed to be a three-way valve with two settings. If AND gate 10 is enabled via a control signal at terminal 13 the wheel which first tends to lock determines the control operation while the enabling of AND gate 11 via a signal at terminal 14, the wheel which is the last to exhibit a tendency to lock determines the control operation while the other wheel is locked.

The terminal 13 is also connected to one input of an AND gate 18 which has a second input connected to the output of member 3 and an inverted input connected to a terminal 19. During select-low operation, when a signal is present at terminal 13, AND gate 18 is enabled except for the first control cycle, during which a signal is present at terminal 19, so that a deceleration signal generated in member 3 will also produce an output from AND gate 18 and actuate a reduction in pressure. Moreover, beginning with a certain value of wheel acceleration at one of the wheels, member 4 provides an output signal, causing the AND gate 20 to produce an output signal which is fed to the inverted input of AND gate 16 to block same and thus prevent any signal appearing at the output of OR gate 15 from causing a reduction in pressure. If both wheels slip, however, the output signal from AND gate 9 causes the acceleration signal to be blocked by AND gate 20 so that the AND gate 16 will again be enabled; it will then be possible to reduce pressure.

Figure 2:
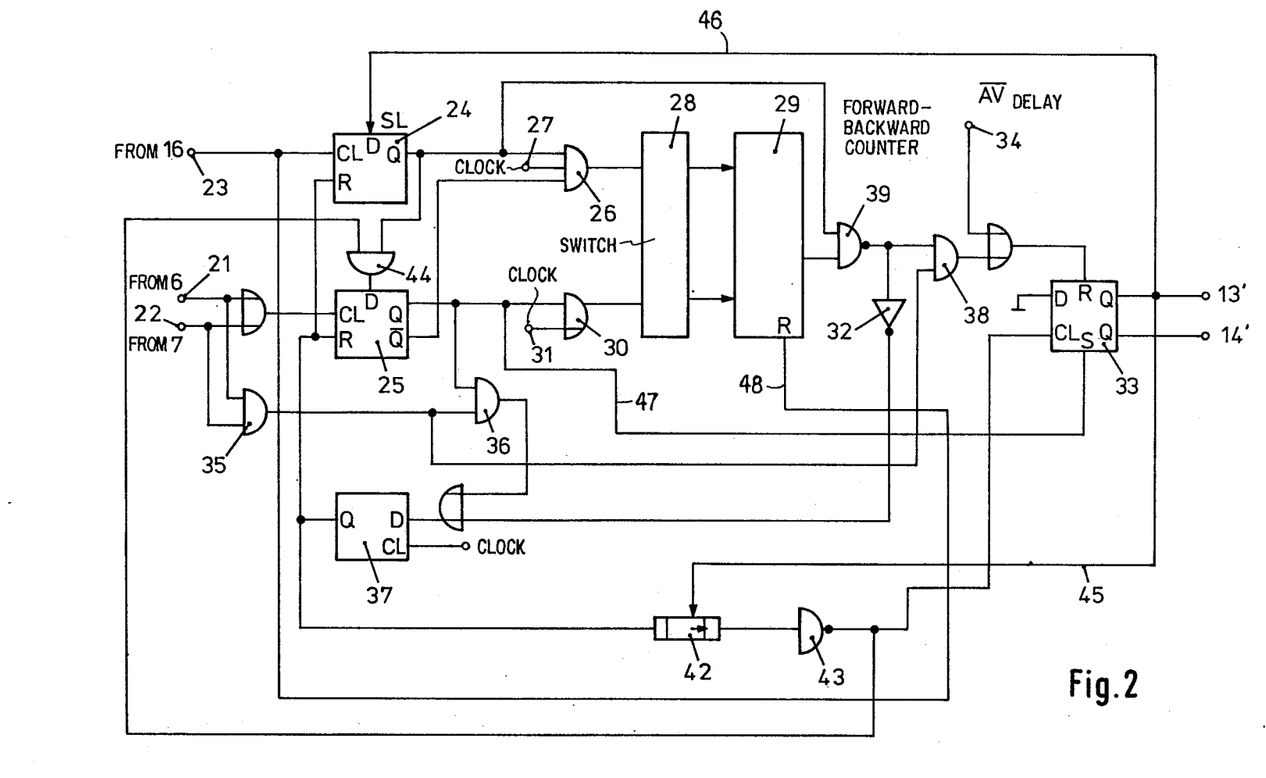
FIG. 2 is a schematic diagram of a preferred embodiment of a circuit which measures time periods $T_1$ and $T_2$ and controls the circuit of FIG. 1 with respect to which mode of operation to employ.

FIG. 2 shows the measuring and control signal circuit for controlling the circuit of FIG. 1. In this circuit, the terminals 21 and 22 receive the signals from the outputs of comparison members 6 and 7, respectively, and the terminal 23 receives the control signal for the valve 17 appearing at the output of AND gate 13. The terminal 23 is connected to the clocking input CL of a bistable member 24, e.g., a flip-flop, which is designed so as to be actuated during the trailing edge of the control signal for the valve 17, i.e., at the end of the pressure reduction process, and — if an L signal is present at the select-low output 13' — goes into the set position as a result of the connection between input D and terminal 13' via line 46. Since, at this time, bistable member 25 is still in the reset position, AND gate 26 will be enabled for the clock pulses fed in at 27 which then reach forward-backward counter 29 via switch 28 and cause it to count forward from 0, for example.

If after the first pressure buildup a slip signal appears at terminal 21 or 22, i.e., if a wheel again becomes unstable, the leading edge of the signal actuates bistable member 25 to take over the L signal appearing at its input D via AND gate 44, i.e., the bistable member 25 goes into the set position. This results in AND gate 26 being blocked and AND gate 30 being enabled to pass the clock pulses fed in at terminal 31. These clock pulses are fed to the counter 29 via the switch 28, which then switches the counter 29 to a backward operation.

Flipping of the bistable member 25 into its set position also causes the bistable member 33 to be switched into its set position as a result of the connection 47 between the Q output of member 25 and the S input of member 33. Previously, the signal $AV_{delayed}$, which occurs at the end of a regulating operation, has brought member 33 into the reset position. When member 33 flips into the set position, an L signal will be present at terminal 14 and thus select-high operation is in effect.

There exist two ways of terminating the running test.

1. Soon after the start of select-high operation, during which one wheel will usually lock, the other wheel will also become unstable. This instability at the other wheel causes a signal to appear at each of terminals 21 and 22 and thus causes AND gate 35 to provide an output signal to AND gate 36 which had been enabled when bistable member 25 flipped. The output signal from AND gate 36 which is present at the D input of bistable member 37 sets bistable member 37 during the next clock pulse arriving at its dynamic input D causing reset signals to be applied to the reset input R of each of the bistable members 24 and 25 to switch same into the reset position. The output signal from AND gate 35 also resets bistable member 33 via the normally enabled AND gate 38 so that an L signal appears at terminal 13 and select-low operation is in effect again. Via a lead 48 connected between terminal 23 and the reset input R of counter 29, the counter 29, is reset during each actuation of valve 17, i.e. during pressure reduction.

2. The second wheel will not become unstable soon after completion of the forward counting process, i.e., duration $T_1$, but only at the end of the time duration $T_2 = x \cdot T_1$, where $x$ may be less, equal to or greater than 1. With $x = 1$, the same pulse repetition frequency may be present at terminals 27 and 31 while with $x < 1$ the pulse repetition frequency at terminal 31 is selected to be correspondingly higher. If the starting position of the counter 29 (e.g., 0) is reached at the end of time duration $T_2$ without the second wheel having become unstable, a signal appears at the output of the counter 29, which output signal causes the NAND gate 39 to block the AND gate 38. Blocking of AND gate 38 no longer permits switching to select-low operation when the second wheel becomes unstable. At the same time the output of NAND gate 39 causes an L signal to be applied to the D input of bistable member 37 via inverter 32 so as to flip bistable member 37 with the next clock pulse and reset bistable members 24 and 25. Flipping back or resetting of members 24 and 25 produces an 0 signal at the D input of member 37, i.e., with the next clock pulse the output signal from the Q output of member 37 will again be an 0 signal. The pulse produced at the output of member 37 between two clock pulses actuates time member 42 which then, due to the inverter 43, no longer emits an output signal during time period $T_3$ which corresponds to its time constant. At the end of time period $T_3$ the trailing edge of the output pulse from time member 42 causes, via dynamic input of bistable member 33, the 0 signal to be transferred to the D input and member 33 to go into the reset position so that select-low operation is again in effect.

Time circuit 42/43 — as already indicated — also responds if the test is interrupted as outlined in 1., i.e., when select-high operation was in effect for a short period of time during the test period. Here, too, time member 42 is actuated by an output pulse from member 37. This blocks gate 44 and prevents flipping of member 25 into the set position for time period $T_4$ which is effective in the select-low case due to the select-low control signal in line 45. Thus in the illustrated circuit forward counting can start during time periods $T_3$ and $T_4$, but it is not possible for time period $T_2$ to start as long as an 0 signal is present at the output of inverter 43.

Figure 3:
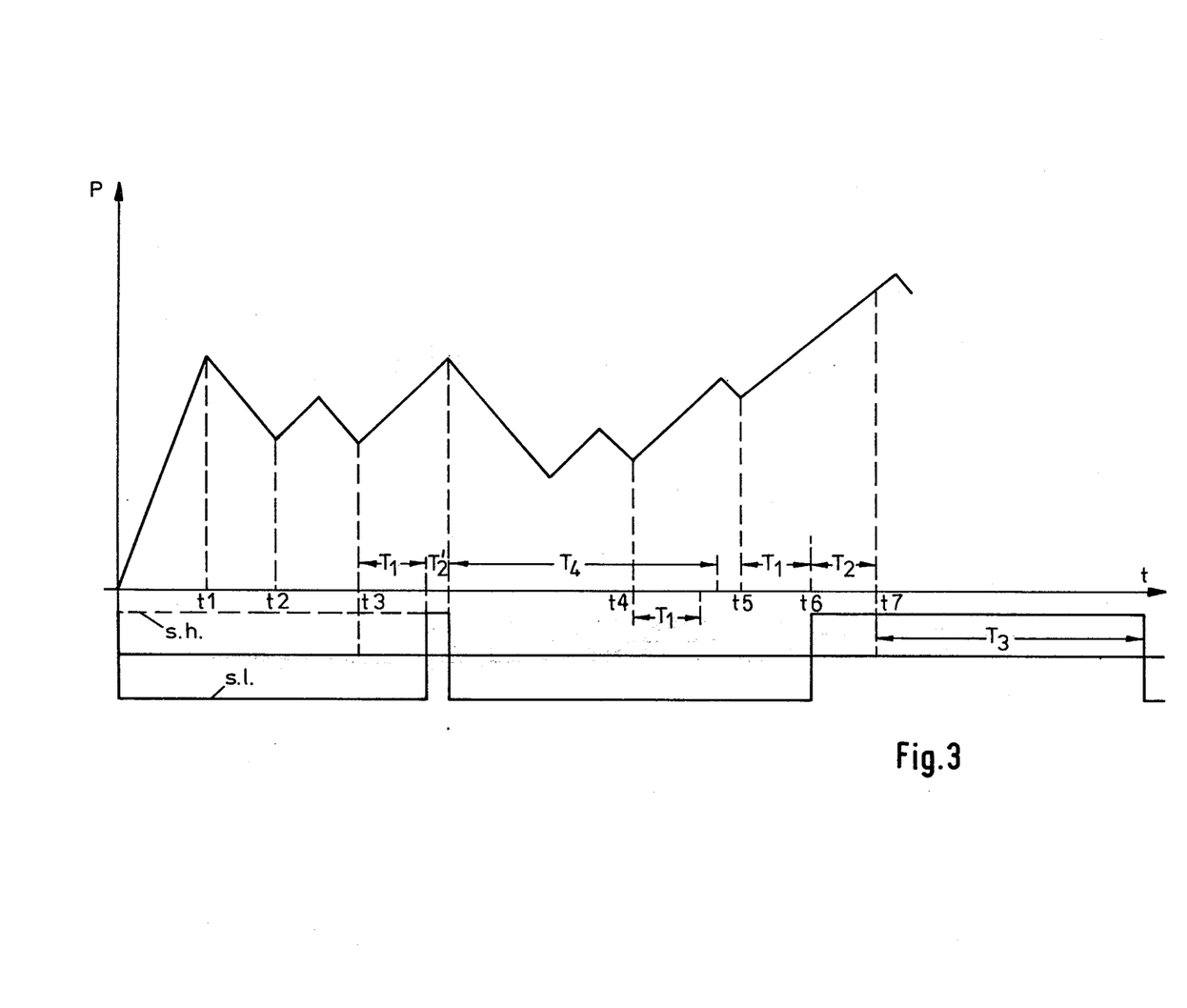
FIG. 3 shows a pressure curve used to explain the operation of the circuit of FIGS. 1 and 2.

FIG. 3 shows a possible pressure curve P in the wheel brakes plotted over time. Additionally, the time periods in which select-high (s.h.) operation is in effect are illustrated by upwardly directed pulses and the time periods in which select-low (s.l.) operation is in effect are illustrated by downwardly directed pulses. The control operation begins at time $t_1$. At time $t_2$ member 24 responds and forward counting in counter 29 begins. Since it is assumed, however, that one wheel is still unstable, but further pressure reduction is suppressed by the acceleration signal, no slip signal leading edge is produced and time period $T_2$ will not start. It is assumed, however, that after pressure reduction both wheels are in the stable state at time $t_3$; thus time period $T_1$ starts at time $t_3$ and is interrupted when a wheel becomes unstable. At the same time select-high operation begins and $T_2$ starts. Since the second wheel becomes unstable soon thereafter $T_2 = x \; T_1$ will not be completed, rather select-high operation is terminated after $T_{2'}$. At the same time select-low operation is actuated for time duration $T_4$. In the above description, $x$ equals 2, for example.

At the end of $T_4$, the end of the next pressure reduction phase initiates a new test sequence at $t_5$. The test also started during time period $T_4$, for example at $t_4$, but it was unable to continue because time period $T_1$ was terminated before the end of $T_4$ and member 25 can be flipped only upon the completion of time period $T_4$.

When the first wheel becomes unstable at $t_6$, time period $T_1$ is terminated and select-high operation starts. At $t_7$ the end of time period $T_2 = x \; T_1$ comes about (counter 29 is in its starting position) and thus the test is completed, which in this case indicates that select-high is maintained during $T_3$. Then the control system changes again to select-low.

The present invention can also be used where the wheels of an axle are driven together and the number of revolutions of the drive shaft is monitored with a single sensor and the resulting signal is utilized to regulate slip. In the case of select-low operation, the value obtained by the sensor from the number of revolutions of the drive shaft, which value corresponds to the speed of the wheels, is compared with a large percentage (e.g. 95%) of a reference value, while in the case of select-high operation the sensor signal is compared with a percentage of the reference value which is somewhat less than 50% (e.g. 45%). In the case of select-low operation the wheel showing a tendency to lock will determine the amount of regulation — since in practice one wheel will always tend to lock earlier during braking — while the other wheel does not contribute. In the case of select-high operation, however, and based on the above conditions, one wheel must be considered to be locked and the other wheel (which was the last to show a tendency to lock) determines the regulation via the sensor, and the drive shaft will then rotate only at half the speed of the still rotating wheel due to the differential effect. This cuts in half the value obtained from the drive shaft which corresponds to the speed of the wheel so that slip can be measured by comparison with a value which is less than 50% of the reference value (e.g. 45%).

Figure 4:
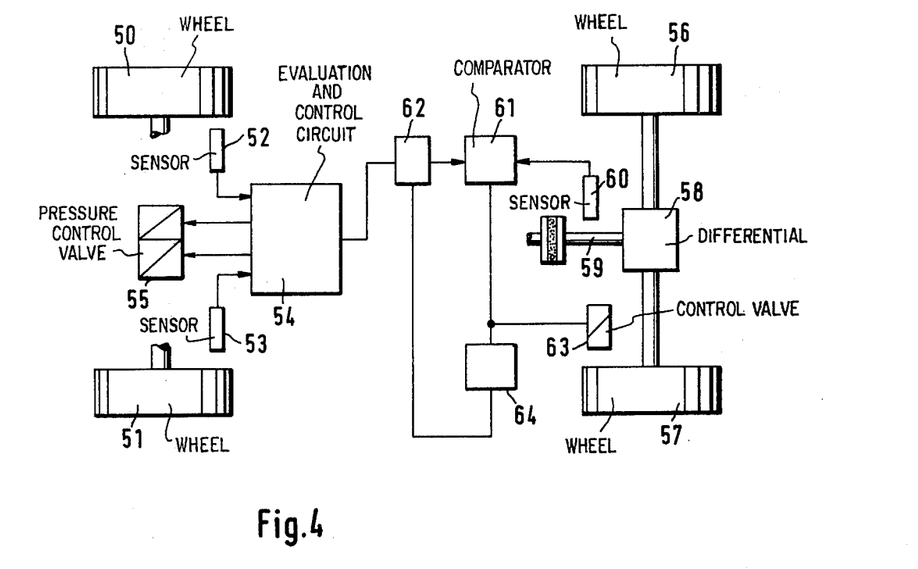
FIG. 4 is a schematic diagram of a further embodiment of the invention.

An embodiment for such a system is shown in FIG. 4. The non-driven front wheels of a vehicle are marked 50 and 51, and the sensors associated with these wheels bear the reference numerals 52 and 53. The evaluation circuit 54 which controls the pressure control arrangements 55 for wheels 50 and 51 is assumed to operate in the same manner as the already described embodiment of FIGS. 1–3.

The rear wheels 56 and 57 are driven by a differential 58. In this embodiment a sensor 60 is associated with the drive shaft 59. The speed value obtained by sensor 60 is compared in comparator 61 with a comparison value supplied by a member 62 which is, for example, normally 95% of the reference value obtained from the front wheels 50 and 51 via the evaluation circuit 54 but can be switched by means of the member 62 to, for example, 45% of the reference value. The brake pressure control unit or valve for the rear wheels is marked 63 and instrument 64 measures the period $T_1$ after a pressure reduction phase until the brake pressure control unit 63 responds. The instrument 64 then causes the member 62 to make the 45% threshold value effective and then proceeds to measure period $T_2$ and compare it with time period $T_1$ until the brake pressure control unit 63 responds again. When the time period $T_2$ has reached a certain relationship to $T_1$, the lower threshold remains in effect for a certain period of time $T_3$, and thus select-high operation remains in effect whereas otherwise the system would be switched back.

Figure 5:
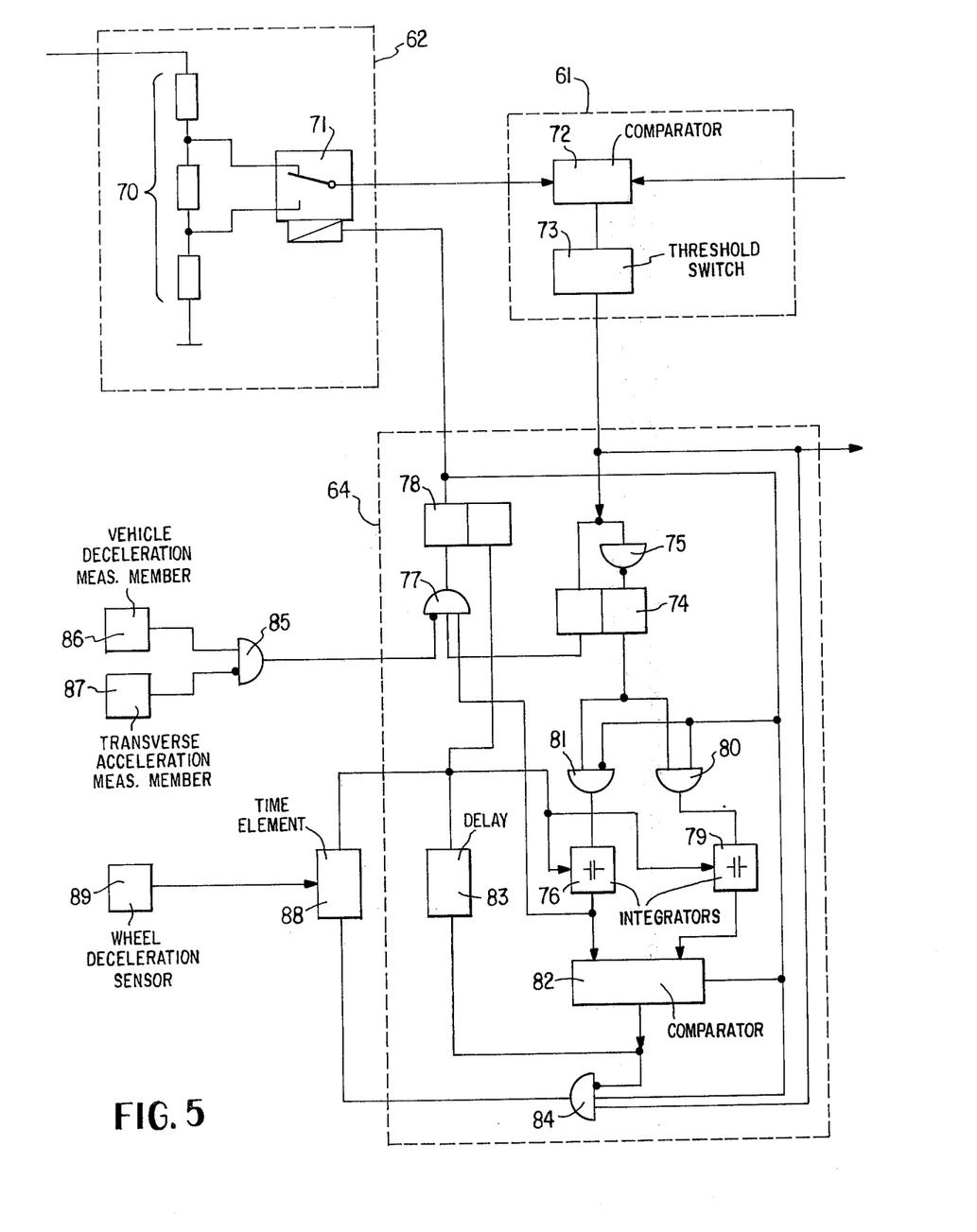
FIG. 5 is a detailed diagram of some blocks of FIG. 4.

In FIG. 5 the blocks 61, 62 and 64 are shown in detail. Here the block 62 comprises a voltage divider 70, at which 95% and 45% of the output-voltage of the block 54 can be picked up. This is done by means of the contact 71, which normally is in the position shown, thus delivering the 95% value to the comparator 72. In this comparator 72 this 95% value is compared with the voltage from sensor 60 and the output signal is the difference between 95% value and the sensor voltage. If this difference is higher than a given level, the threshold switch 73 delivers a signal, which effects a pressure decrease.

This signal is also applied to the bistable member 74, which is thereby set in the position in which the left output delivers an output signal. When the output signal of switch 73 is terminated (and also the pressure decrease) the bistable member 74 is set in its second position by means of the inverter 75 and now a current is delivered to the integrator 76, which integrates the current until a new output signal of switch 73 occurs. The integrated current is a measure of $T_1$. Because the integrator 76 is loaded, and thus prepares and-gate 77, the resetting of bistable member 74 at the beginning of the next pressure decreasing signal sets bistable member 78 which then switches the contact 71 to its other position, thus delivering the 45% value to the comparator 72. When the output of switch 73 is terminated, a current is delivered to the second integrator 79 via and-gate 80 (which is prepared by the output of 78 while the and-gate 81 is blocked). The integrated current in integrator 79 is a measure of $T_2$. The integration is terminated when a new output signal of switch 73 occurs. During the integration in integrator 79 the comparator 82 compares the two integrated values. It gives an output signal when the value in integrator 79 has reached a given relationship to the value in the integrator 76. This output signal is fed to a delay member 83 and there it is delayed for a given time $T_3$ (select-high operation). Then the bistable member 78 is reset and a new measurement of $T_1$ and $T_2$ begins. If, however, the value in integrator 79 does not reach the given relationship before the new pressure decreasing signal occurs and resets bistable member 74, an output signal is generated at and-gate 84 (no output signal at comparator 82, but output signal at switch 73 and member 78) which at once resets bistable member 78 and thus causes select low operation. The resetting signals for member 78 also cause a discharge of the integrators 76 and 79; this is necessary for the new measurement of $T_1$ and $T_2$.

The antilocking control system described above with respect to FIGS. 1–5 can be improved in that a vehicle deceleration measuring device is employed and blocking means are provided which prevent a test from being run through or completed as long as the vehicle deceleration exceeds a given value $a_1$ of, for example, 0.6g. In this case time period $T_1$ can be permitted to start but the test will not be completed, i.e., time period $T_2$ will not start if at the end of time period $T_1$, $a_1$ is still high enough.

Additionally a transverse acceleration measuring device can be provided and utilized to sense driving through curves. When a transverse acceleration of a given value $a_q$ is present, the influence of the vehicle deceleration signal can be made ineffective, i.e., the test will be permitted to be completed in any case.

An embodiment is represented in FIG. 5. Here the and-gate 77 has a further input, which blocks and-gate 77 if a signal occurs at the output of and-gate 85. And-gate 85 delivers a signal if the vehicle deceleration measuring member 86 delivers a signal because a given deceleration is exceeded. This signal is blocked when the transverse acceleration measuring member 87 delivers a signal because a given transverse acceleration is exceeded. By the output signal of and-gate 85 a switching to the select-high-mode is prevented as long as a given vehicle deceleration is present (without transverse acceleration).

With combined pressure regulation at the brakes of wheels on different sides of the vehicle, it is known that during driving through curves one wheel will tend to lock earlier because of its reduced load. According to a further embodiment of the present invention, it is therefore proposed to make effective an additional, greater slip threshold lying, for example, 50 km/h, below the reference value when a transverse acceleration signal is present and to compare the wheel which first tends to lock, i.e., the select-low wheel, with this threshold value. If under the above condition ($a_q$), the slip falls below this threshold value during select-high operation, the system is switched back to select-low operation. When the slip threshold value is exceeded, select-high operation becomes effective again. Preferably, however, the system is switched back only if in addition to the slip threshold being exceeded the wheel acceleration signal has ended also. According to a further embodiment of the invention, a wheel acceleration signal (end of acceleration) (i.e., wheel acceleration of a certain magnitude) can also be utilized to decide switching to select-high operation if no transverse acceleration signal is present but one wheel is still unstable. When a high slip threshold of, for example, 50 km/h is used, the slip must also not fall below this threshold. In this case it would actually suffice if a control signal were fed to the Cl input of member 25 upon the presence of these conditions. Preferably, however, this signal is utilized to actuate a test with a different test ratio $T_2/T_1$, in particular with a substantially longer time period $T_2$. In this case counter 29 of FIG. 2 would receive pulses during time period $T_2$ at a correspondingly lower frequency.

In order to prevent a slight shimmying of a locked or almost locked select-low wheel from simulating acceleration signals, a further embodiment of the invention provides for a filter arrangement which suppresses utilization of acceleration signals until the wheel has exceeded a given speed threshold for a certain period of time (e.g. 15 km/h for 10 msec.).

If a deceleration signal is utilized in the antilocking control system to effect pressure reduction, a wheel deceleration signal inadvertently present at the end of time period $T_4$ (i.e., of impressed select-low operation) is preferably utilized to prevent another test from being actuated immediately. Preferably, this blockage is maintained until the end of the deceleration signal.

An embodiment is shown in FIG. 5; there in the line leading from and-gate 84 to the reset input of member 78 a time element 88 may be inserted, which makes a signal occuring on this line effective for a given time $T_4$, thus preventing a select-high-operation for that time. If a wheel deceleration of given value is sensed by means of the sensor 89 at the end of time $T_4$ this time $T_4$ is prolongated until this sensor signal is terminated.

If during the select-high mode of operation the slip signals from both wheels disappear, it is favorable to immediately interrupt the impressed select-high operation, i.e., the running time period $T_3$ is suppressed.

Figure 6:
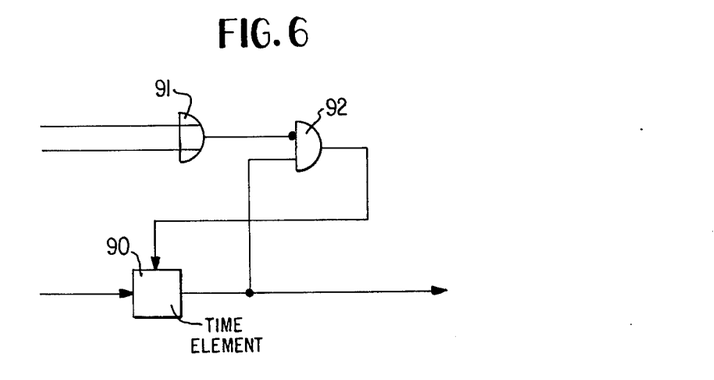
FIG. 6 is a further detail, which may be used in the embodiments of the invention.

In FIG. 6 an embodiment is represented by which the time element for $T_3$ is influenced in such a manner that this time period is discontinued under certain conditions. In FIG. 6 the time element (for example 83 in FIG. 5) which causes select high operation for the period $T_3$ is numbered 90. To the or-gate 91 which corresponds to or-gate 8 of FIG. 1 the slip signals of two wheels are delivered. And-gate 92 gives a output signal if during $T_3$ both slip-signals disappear. This output signal is fed to the time-member 90, which then at once is blocked and no longer provides an output signal. Thus the select-high-operation is terminated.

With the assumption of significantly different $\mu$ values on both sides of the car (split conditions) and select-high operation, braking will be poor temporarily since after select-high operation select-low operation would become effective and the select-low wheel would be accelerated but slowly on the low $\mu$. A further embodiment of the invention therefore provides that after switching to the select-low mode of operation a test be made to determine whether the select-low vehicle wheel still is below a low speed of, for example, 15 km/h after a given period of time. If this is the case, the system is switched to the select-high mode of operation after a given period of time. This time can be changed in dependence on the reference value. Under certain conditions, a priority pressure reduction signal may be produced, for example if with select-low operation and under the condition that the reference value does not correspond to a vehicle speed which is less than a given threshold of, for example, 25 km/h, the slower wheel has a speed less than a second threshold of e.g. 15 km/h. Under these conditions a wheel acceleration signal would build up pressure. It is appropriate, however, in this case to let the wheel first reach a certain speed.

Such a pressure reduction could also be effected with priority if during the first control cycle or after switching to select-low a slip signal is determined to be present as a result of a test longer than a given period of time $\Delta t$ of, for example, ¼ second. This pressure reduction remains in effect until no wheel has a slip ($\lambda$) signal and the acceleration signal has also disappeared. In the embodiment of FIG. 1 these signals would be applied after the AND gate 16.

Figure 7:
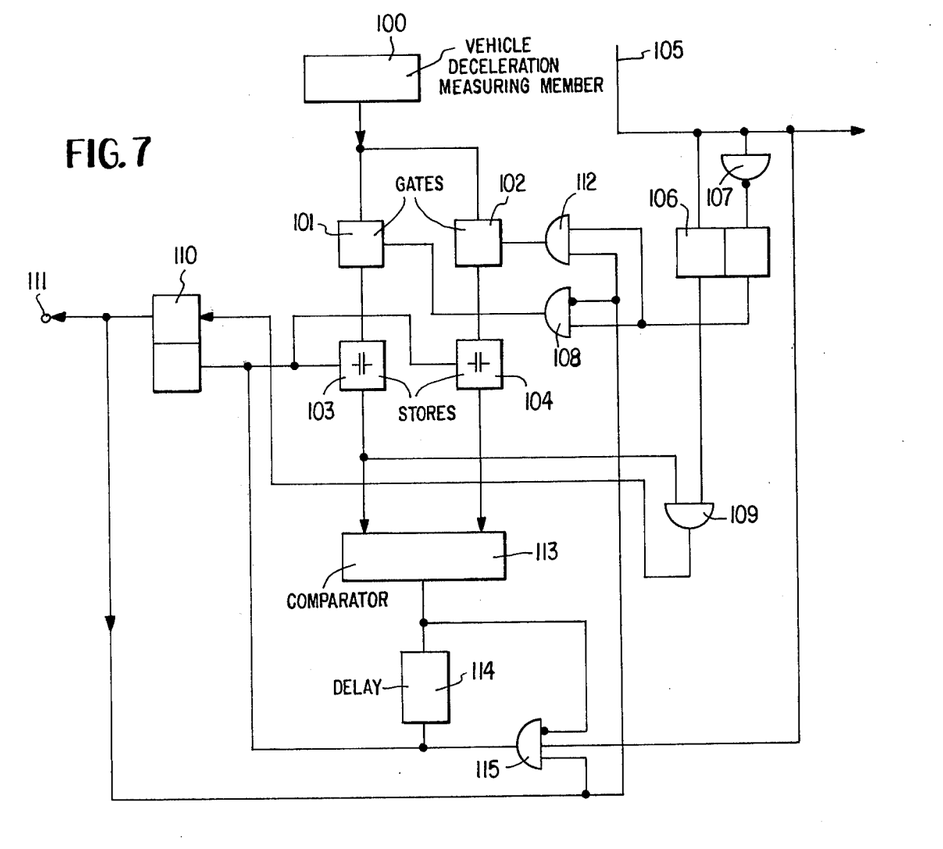
FIG. 7 is a schematic diagram of a further embodiment of the invention.

In FIG. 7 an embodiment is represented in which not the times $T_1$ and $T_2$ but the vehicle deceleration within these times are measured. To accomplish this, there is provided a vehicle deceleration measuring member which delivers voltages proportional to the vehicle deceleration, via gates, to members 103 and 104 which either store the maximum of the voltages fed to them or which generate the average of the voltages fed to them within the times $T_1$ and $T_2$. On line 105 the control signal is delivered to the pressure decreasing valve (not shown). Similar to FIG. 5 these pressure decreasing signals set the bistable member 106 in the state in which the left output delivers a signal, while this member 106 is set in its other state (because of inverter 107) when the signal on line 105 disappears. When the signal on line 105 disappears first time gate 101 is opened via and-gate 108 and thus a signal proportional to the highest vehicle deceleration during the period $T_1$ is stored in the store 103. The next signal on line 105 again blocks the gate 101, but now, because a signal is stored in store 103, the output signal of the left output of member 106 passes via and-gate 109 to the bistable member 110 and sets this member in the state in which a output signal is delivered to output terminal 111, which signal is used to cause select-high-operation; till now select-low-operation was effective. If the signal on line 105 then disappears because of the select high operation, member 106 is set, but now gate 102 is opened via and-gate 112 and the vehicle deceleration signal is fed to store 104. If the stored signal is in a given relationship to the stored value in store 103 the comparator 113 emits a signal which is delayed in time member 114 for a given time period $T_3$ and which after this time resets member 110 thus terminating select-high operation. If, within the time period beginning with switching over to select high operation and terminating when in this operation modus a signal occurs on line 105, the value in store 104 does not reach the given relationship to the value in store 103 then upon the occurrence of the signal on line 105 a signal is generated by means of and-gate 115 which signal at once resets member 110 and thus terminates select high operation. These reset signals also discharge the stores 103 and 104.

It will be understood that the above description of the present invention is susceptible to various modifications, changes and adaptations, and the same are intended to be comprehended within the meaning and range of equivalents of the appended claims.

What is claimed is:

1. In an antilocking control system for the wheel brakes of a vehicle including a pressure regulating unit for commonly regulating the pressure in the brakes of at least two wheels of the vehicle, sensor means for producing output signals corresponding to the rotational behavior of the wheels whose brakes are being regulated, and evaluation and control circuit means responsive to the output signals from said sensor means for producing control signals for said pressure regulating means to cause same to regulate the pressure, said control signals being selectively based either on the rotational behavior of the wheel first tending to lock (select-low) or on the rotational behavior of the wheel which is the last to show a tendency to lock (select-high), the improvement wherein said evaluation and control circuit means includes: first means effective during the select-low mode of operation for measuring the time duration ($T_1$) of the pressure buildup phase following a pressure reduction phase until there again occurs a tendency to lock at at least one wheel; switching means responsive to the occurrence of a signal indicating a tendency to lock for switching the mode of operation to select-high; second means for measuring the time duration ($T_2$) of the pressure increase period during said select-high mode of operation and for continuously comparing the result with the measured time duration ($T_1$) of the pressure buildup phase during select-low operation; control means responsive to the measured time duration $T_2$ having reached a given relationship to the previously measured time duration $T_1$ for effecting continuation of the select-high mode of operation for a given time duration $T_3$ and then switching the mode of operation back to the select-low mode of operation; and switch-back means responsive to an indication, during select-high operation, that the second wheel also shows a tendency to lock before a given time duration $T_2$ has been reached for effecting a switch-back to the select-low mode of operation.

2. An antilocking control system as defined in claim 1 wherein: the two wheels being regulated are the driven wheels of a vehicle which are driven by a differential; wherein said sensor means comprises a sensor for monitoring the number of revolutions of the drive shaft and for producing an output value corresponding thereto; and said evaluation and control circuit means includes means for comparing said value obtained from said sensor with a large percentage (e.g. 95) of a reference value which corresponds to the speed of the vehicle during select-low operation and for comparing the value obtained from said sensor with a percentage less than 50% of said reference value (e.g. 45%) during the select-high operation.

3. An antilocking control system as defined in claim 1 wherein said sensor means includes at least two sensors, one associated with each of the two wheels or wheel groups being regulated by said pressure regulating unit.

4. An antilocking control system as defined in claim 3 wherein said evaluation and control circuit means further includes a timing means, which is actuated by said switch-back means, for preventing switching to the select-high mode of operation for a given period of time $T_4$.

5. An antilocking control system as defined in claim 4 wherein said timing member is also responsive to said second means to provide said time duration $T_3$.

6. An antilocking control system as defined in claim 4 wherein said evaluation and control circuit means includes means for utilizing a wheel deceleration signal to effect pressure reduction by said pressure control unit; and further comprising means, responsive to the presence of such a wheel deceleration signal at the end of said period $T_4$ with impressed select-low operation, for blocking the initiation of a further test until the termination of said pressure reduction signal.

7. An antilocking control system as defined in claim 3 wherein said evaluation and control circuit means includes at least one counter means for counting a series of clock pulses as a measure of said time durations $T_1$ and $T_2$.

8. An antilocking control system as defined in claim 7 wherein said counting means includes a forward-backward counter which counts in one direction during time duration $T_1$ and in another direction during time duration $T_2$.

9. An antilocking control system as defined in claim 8 further comprising further switching means for controlling the direction of counting of said counter and for feeding clock pulse sequences with different pulse repetition frequencies to said forward-backward counter during the time periods $T_1$ and $T_2$, said clock pulse repetition frequencies being selected so that at the end of time duration $T_2$ the starting point of said counter is reached.

10. An antilocking control system as defined in claim 3 wherein said evaluation and control circuit means further includes first and second comparator means for providing respective slip signals from the output signals of said sensors; an OR gate and an AND gate, each combining the outputs of said first and second comparator means; first and second gate circuits connected to the outputs of said OR and AND gates respectively; means for enabling said first gate circuit during select-low mode of operation; means for enabling said second gate circuit during select-high mode of operation; and logic circuit means for connecting the outputs of said first and second gate circuits to said pressure regulating unit to control same.

11. An antilocking control system as defined in claim 10 wherein said evaluation and control circuit means further includes: additional circuit means responsive to the output signals from said sensors for providing signals when a given deceleration has been reached at one wheel; and further gate circuit means for causing said deceleration signals to become effective on said pressure regulating unit only during the select-low mode of operation.

12. An antilocking control system as defined in claim 11 further comprising means for suppressing the effect of a wheel deceleration signal during the first control cycle.

13. An antilocking control system as defined in claim 10 wherein said evaluation and control means further includes additional circuit means responsive to the output signals from said sensors for providing signals when a given wheel acceleration has been reached; and further gate circuit means responsive to these acceleration signals for preventing said pressure regulating unit from producing a pressure reduction as a result of an output signal from said first or second gate circuits caused by a slip signal.

14. An antilocking control system as defined in claim 13 further comprising means responsive to an output signal from said AND gate indicating that slip signals are obtained from both sensors for suppressing the effect of said acceleration signal.

15. An antilocking control system as defined in claim 3 further comprising: a vehicle longitudinal deceleration sensor; blocking circuit means responsive to the output signals from said longitudinal deceleration sensor for preventing the completion of a test sequence if the longitudinal vehicle deceleration exceeds a given value.

16. An antilocking control system as defined in claim 15 wherein said test is made by measuring the time periods $T_1$ and $T_2$, and said blocking circuit means prevents switching to the select-high mode of operation and prevents the measuring of the time period $T_2$ as long as the longitudinal vehicle deceleration exceeds a given value.

17. An antilocking control system as defined in claim 15 further comprising a vehicle transverse acceleration sensor and means responsive to the output signals of said transverse acceleration sensor for rendering said blocking circuit means ineffective to stop said test sequence upon the presence of said longitudinal deceleration signal if a given transverse acceleration value has been exceeded.

18. An antilocking control system as defined in claim 3 wherein the brakes whose pressure is regulated in common are disposed on different sides of the vehicle; wherein said evaluation and control circuit means is responsive to the signals from said sensors to produce slip and wheel acceleration signals; and further comprising: a transverse acceleration sensor means for emitting an output signal at a given value of transverse acceleration; means responsive to said output signal from said transverse acceleration sensor for rendering an additional relatively high slip threshold effective within said evaluation and control circuit; and means for causing a switching to a select-low mode of operation when the signal from one wheel falls below this additional slip threshold during select-high mode of operation.

19. An antilocking control system as defined in claim 18 wherein said means for causing a switch to a select-low mode of operation includes means for causing switching back to a select-high mode of operation only after said relatively high slip threshold has been exceeded and the acceleration of the corresponding wheel has fallen below a given wheel acceleration value.

20. An antilocking control system as defined in claim 18 further comprising means for terminating the time period $T_1$ and effecting switching to a select-high mode of operation when, upon the absence of a transverse acceleration signal but the presence of wheel acceleration signal of a certain magnitude and with at least a slip signal from one wheel, the wheel acceleration signal drops.

21. An antilocking control system as defined in claim 20 wherein upon continuation of the tests due to the presence of a wheel acceleration signal, time period $T_2$ is extended.

22. An antilocking control system as defined in claim 21 further comprising filter means for permitting the wheel acceleration signal to become effective only if the corresponding wheel exceeds a given speed for a given period of time.

23. Antilocking control system as defined in claim 3 further comprising switching means for switching back to a select-low mode of operation if the signals during time period $T_3$ which indicate instability of the wheels have disappeared.

24. Antilocking control system as defined in claim 3 further comprising testing means for determining, after switching from a select-high to a select-low mode of operation, whether the select-low wheel still falls below a lower speed threshold after a given period of time and for then immediately switching to a select-high mode of operation if this threshold is not exceeded.

25. An antilocking control system as defined in claim 3 wherein said evaluation and control circuit means further includes means for producing a priority pressure reduction signal for said pressure control unit if a reference value representing the speed of the vehicle is greater than a first threshold value, a select-low mode of operation is in effect, and the slower rotating wheel falls below a second lower speed threshold.

26. An antilocking control system as defined in claim 3 wherein said evaluation and control circuit further includes means, responsive to the presence of a slip signal during select-low operation over a given period of time, for producing a pressure reduction signal for said pressure control unit and for terminating this pressure reduction signal only if both wheels are in the stable range, and the re-acceleration phase of the system has been completed.

27. An antilocking control system as defined in claim 26 wherein said pressure reduction signal becomes effective only during the first control cycle or after switching back to select-low operation as a result of the test performed.

28. In an antilocking control system for the wheel brakes of a vehicle including a pressure regulating unit for commonly regulating the pressure in the brakes of two wheels of the vehicle, a sensor associated with each of the regulated wheels for producing output signals corresponding to the rotational behavior of the wheels, and evaluation and control circuit means responsive to the output signals from said sensors for producing control signals for said pressure regulating means, to cause same to regulate the pressure, said control signals being selectively based either on the rotational behavior of the wheel first tending to lock (select-low) or on the rotational behavior of the wheel which is the last to show a tendency to lock (select-high); the improvement wherein said evaluation and control circuit means includes: first means effective during the select-low mode of operation for measuring the vehicle deceleration $V^*_{F1}$ during the pressure buildup period following a pressure reduction period; a switching means, responsive to the occurrence of a signal indicating a tendency to lock following pressure buildup, for switching the mode of operation to the select-high mode; second means for measuring the vehicle deceleration $V^*_{F2}$ during this select-high mode of operation; control means responsive to the vehicle deceleration $V^*_{F2}$ having reached a given relationship to the vehicle deceleration $V^*_{F1}$ for effecting continuation of the select-high mode of operation for a given period of time and then for switching the mode of operation back to the select-low mode of operation; and switch-back means, responsive to an indication during select-high operation that the second wheel also shows a tendency to lock before the given relationship $V^*_{F2}$ to $V^*_{F1}$ has been reached, for immediately switching the mode of operation back to the select-low mode.

* * * * *